US 6,710,914 B2

(12) United States Patent
Arbore et al.

(10) Patent No.: US 6,710,914 B2
(45) Date of Patent: Mar. 23, 2004

(54) TUNABLE LIGHT SOURCE EMPLOYING OPTICAL PARAMETRIC OSCILLATION NEAR DEGENERACY

(75) Inventors: Mark A. Arbore, Los Altos, CA (US); Lawrence E. Myers, Palo Alto, CA (US)

(73) Assignee: Lightwave Electronics, Mountain View, CA (US)

( * ) Notice: Subject to any disclaimer, the term of this patent is extended or adjusted under 35 U.S.C. 154(b) by 317 days.

(21) Appl. No.: 09/863,842

(22) Filed: May 22, 2001

(65) Prior Publication Data

US 2002/0176472 A1 Nov. 28, 2002

(51) Int. Cl.$^7$ ................................................ G02F 1/39
(52) U.S. Cl. ...................................................... 359/330
(58) Field of Search .................................. 359/362–332

(56) References Cited

U.S. PATENT DOCUMENTS

| | | | | |
|---|---|---|---|---|
| 5,047,668 A | * | 9/1991 | Bosenberg | ................... 359/330 |
| 5,172,390 A | | 12/1992 | Mooradian | ................... 372/92 |
| 5,233,462 A | * | 8/1993 | Wong | ........................ 359/330 |
| 5,319,668 A | | 6/1994 | Luecke | ....................... 372/107 |
| 5,347,527 A | | 9/1994 | Favre et al. | .................... 372/20 |
| 5,418,802 A | * | 5/1995 | Chwalek | ..................... 372/20 |
| 5,491,714 A | | 2/1996 | Kitamura | ..................... 372/92 |
| 5,493,575 A | | 2/1996 | Kitamura | ..................... 372/20 |
| 5,594,744 A | | 1/1997 | Lefevre et al. | ................ 372/20 |
| 5,800,767 A | | 9/1998 | Byer et al. | ................... 264/430 |
| 5,838,720 A | | 11/1998 | Morelli | ........................ 375/219 |
| 5,862,162 A | | 1/1999 | Maeda | ......................... 372/20 |
| 5,867,512 A | | 2/1999 | Sacher | ......................... 372/20 |
| 5,875,053 A | | 2/1999 | Webjorn et al. | ............. 359/326 |
| 5,912,910 A | | 6/1999 | Sanders et al. | ................ 372/22 |
| 6,013,221 A | | 1/2000 | Byer et al. | ................... 264/436 |
| 6,026,100 A | | 2/2000 | Maeda | ......................... 372/20 |
| 6,038,239 A | | 3/2000 | Gabbert | ........................ 372/20 |
| 6,115,401 A | | 9/2000 | Scobey et al. | ............... 372/100 |
| 6,134,250 A | | 10/2000 | Koren et al. | .................... 372/6 |
| 6,229,828 B1 | | 5/2001 | Sanders et al. | ................ 372/22 |
| 6,501,591 B1 | * | 12/2002 | Kumar et al. | ............... 359/330 |
| 2002/0176454 A1 | * | 11/2002 | Arbore et al. | ................. 372/20 |

OTHER PUBLICATIONS

M.A. Arbore; M.M. Fejer, "Singly Resonant Optical Parametric Oscillation in Periodically Poled Lithium Niobate Waveguides," Feb. 1, 1997, vol. 22, No. 3, *Optics Letters*, p. 151.

K. Burr; C.L. Tang; Mark Arbore; Martin Fejer, "High–Repetition–Rate Femtosecond Optical Parametric Oscillator Based on Periodically Poled Lithium Niobate," Apr. 23, 1997, No journal name.

(List continued on next page.)

*Primary Examiner*—John D. Lee
(74) *Attorney, Agent, or Firm*—Lumen Intellectual Property Services, Inc.

(57) ABSTRACT

A tunable light source equipped with an optical parametric amplifier (OPA) placed in a cavity for performing an optical parametric oscillation (OPO) driven by a pump beam at a pump frequency selected within a certain range such that the OPO is driven near degeneracy. An adjustment mechanism adjusts the pump frequency within a wavelength tuning range to select a gain spectrum of the OPO and a spectral control mechanism sets a resonant frequency of the cavity within that gain spectrum. Thus, only one of the idler and signal beams within the passband set by the narrowband tuner is supported inside the cavity. Other nonlinear frequency conversion operations can also be performed within the cavity in conjunction with the OPO. The light source can be operated in cw, near-cw and pulsed operation modes as a broadly tunable narrowband source covering a wavelength window of 250 nm.

55 Claims, 7 Drawing Sheets

U.S. PATENT DOCUMENTS

M.H. Chou; J. Hauden; M.A. Arbore; M.M. Fejer, "1.5-$\mu$m–band Wavelength Conversion Based on Difference–Frequency Generation in LiNbO$_3$ Waveguides with Integrated Coupling Structures," Jul. 1, 1998, vol. 23, No. 13, *Optics Letters*, p. 1004.

I. Brener; M.H. Chou; D. Peale; M.M. Fejer, "Cascaded $\chi(2)$ Wavelength Converter in LiNbO$_3$ Waveguides with Counter–Propagating Beams," Jul. 8, 1999, vol. 35, No. 14, *Electronics Letters*, p. 1155.

M.H. Chou; I. Brener; K.R. Parameswaran; M.M. Fejer, Stability and Bandwidth Enhancement of Difference Frequency Generation (DFG)–based Wavelength Conversion by Pump Detuning, Jun. 10, 1999, vol. 35, No. 12, *Electronics Letters*, p. 978.

Michael L. Bortz, "Quasi–Phasematched Optical Frequency Conversion in Lithium Niobate Waveguides," 1995, PHD Dissertation, Stanford Unversity.

M.L. Bortz; M. Fujimura; M.M. Fejer, "Increased Acceptance Bandwidth for Quasi–Phasematched Second Harmonic Generation in LiNbO$_3$ Waveguides," Jan. 6, 1994, vol. 30, pp. 34–35, No. 1, *Electronics Letters*.

Michael G. Littman; Harold J. Metcalf, "Spectrally Narrow Pulsed Dye Laser without Beam Expander," Jul. 15, 1978, vol. 17, No. 14, pp. 2224–2227, *Applied Optics*.

Karen Liu; Michael G. Littman; "Novel Geometry for Single–Mode Scanning of Tunable Lasers," *Optics Letters*, vol. 6, No. 3, pp. 117–118, Mar. 1981.

K.C. Harvey; C.J. Myatt, "External–Cavity Diode Laser using a Grazing–Incidence Diffraction Grating," Optics Letters, vol. 16, No. 12, pp. 910–912, Jun. 1991.

Tim Day; Michael Brownell; I–Fan Wu, "Widely Tunable External Cavity Diode Lasers," SPIE, vol. 2378, pp. 35–41, Apr. 1995.

\* cited by examiner

TUNABLE LIGHT SOURCE EMPLOYING OPTICAL PARAMETRIC OSCILLATION NEAR DEGENERACY

RELATED APPLICATIONS

This application relates to U.S. Ser. No. 09/863,840 filed on May 22, 2001.

FIELD OF THE INVENTION

The present invention relates generally to tunable light sources, and more particularly to using the process of optical parametric oscillation (OPO) near degeneracy to obtain a light source with a wide and stable tuning range.

BACKGROUND OF THE INVENTION

The continuing optics revolution is bringing about changes in many fields of technology. For example, fiber-optic networks employing dense wavelength division multiplexing (DWDM) are becoming increasingly pervasive as the backbone of modern communications systems. At the same time, machining devices employing lasers for precision processing, e.g., cutting, scribing and/or polishing of various materials including biological tissue are displacing traditional mechanical equipment. In still other fields, laser-based systems are being adapted for display purposes.

The above-mentioned technologies, as well as many others, require light sources with appropriate performance parameters. Specifically, there is a demand for tunable light sources, i.e., tunable lasers that can be tuned over a wide range of wavelengths. Such tunable light sources should additionally exhibit excellent spectral characteristics, e.g., clean and narrowband output as well as absence of mode hops and/or power fluctuations during the tuning process. Furthermore, suitable light sources need to be simple in construction, versatile, and economical.

Such tunable laser sources are desired, for instance, in swept wavelength testing of passive and active telecommunication components. Testing a component can include, for example, measuring transmission, reflection or loss for any combination of the component's ports as a function of wavelength. Swept wavelength testing requires a very wide tuning range and/or a narrow test beam spectrum. In some cases a tuning range of 250 nm with a 0.1 to 10 pm test signal bandwidth is required. In addition to the swept wavelength approach, optical component testing can also be performed by a step-and-measure approach, by measurements at discrete wavelengths, or other variants of combining the tuning properties of the laser with measurements of relevant data. In this document, the term swept wavelength testing is intended to include these variants. Tunable laser sources are also employed in multi-channel coherent communication systems, spectroscopic measurements, and optical amplifier characterizations.

The prior art teaches the use of extended (or external) cavity diode lasers (ECDLs) to provide tunable laser sources for swept wavelength testing in telecommunications and other applications. A detailed description of external cavities is well documented in the art, for example, in "Spectrally Narrow Pulsed Dye Laser without Beam Expander" by Littman et al., Applied Optics, Vol. 17, No. 14, pp. 2224–2227, Jul. 15, 1978; "Novel geometry for single-mode scanning of tunable lasers" by Littman et al., Optics Letters, Vol. 6, No. 3, pp. 117–118; "External-Cavity diode laser using a grazing-incidence diffraction grating" by Harvey et al., Optics Letters, Vol. 16, No. 12, pp. 910–912; and "Widely Tunable External Cavity Diode Lasers" by Day et al., SPIE, Vol. 2378, pp. 35–41.

In a tunable ECDL the wavelength range is determined by the gain bandwidth of the lasing medium while wavelength selection and tuning functions are external to the gain element. These functions are typically accomplished by adjusting a total optical length L of the external cavity and its spectral response or passband. A diffraction grating and a movable mirror can be used for these purposes. The number of nodal points of the standing wave in the laser cavity is proportional to $L/\lambda$, where $\lambda$ is the operating wavelength and L is the total optical length of the laser cavity (primarily provided by the length $L_{ext}$ of the external cavity) Therefore, if the wavelength tuning takes place while L is maintained constant, the number of nodal points in the laser cavity changes discontinuously. That is, the wavelength cannot be continuously varied, but rather, it leaps in discrete steps—termed as mode-hops. As a result, it is often difficult to tune in a desired wavelength, and there may also be substantial fluctuations in the output power of the laser.

The prior art teaches to mitigate or avoid mode-hops by varying the length L of the laser cavity as wavelength tuning is taking place. Coordinating the wavelength tuning and the cavity-length change in ECDLs has been a rather arduous and expensive undertaking. Documentation of further efforts to prevent mode-hops and provide more continuous tuning are found in U.S. Pat. Nos. 5,172,390, 5,319,668, 5,347,527, 5,491,714, 5,493,575, 5,594,744, 5,862,162, 5,867,512, 6,026,100, 6,038,239, and 6,115,401.

Diode lasers typically have gain bandwidths (and therefore tuning ranges) of about 1–5% of the optical wavelength, or about 30 nm if centered near 1550 nm. Some diode lasers which are optimized for broad gain bandwidth (at the expense of other properties) can have somewhat larger gain bandwidths. Therefore, external cavity diode lasers with tuning ranges of about 50–100 nm are now commercially available. However, tuning ranges approaching 250 nm are extremely difficult or impossible to achieve with a diode laser despite all the efforts documented in the prior art.

In U.S. Pat. No. 6,134,250 the inventors describe a single-mode wavelength selectable ring laser, which operates at a single wavelength selectable from any channel passband of a multiple-channel wavelength multiplex/demultiplex element (e.g., an arrayed waveguide grating router (AWGR)). A Fabry-Perot semiconductor optical amplifier (FP-SOA) is connected to AWGR to form a ring laser structure, where FP-SOA is used as an intra-cavity narrow-band mode-selecting filter to stabilize the laser oscillation to a single axial mode. As such, this ring laser system can only provide discrete tuning from one wavelength passband of the wavelength filter to another. That is, continuous tuning cannot be achieved in this system. Hence, this prior art laser system is suited for providing a wavelength-selectable laser, as opposed to a wavelength tunable laser.

Prior art also suggests turning to other types of lasers and elements to achieve a wide and stable wavelength tuning range. Unfortunately, none of the prior art systems has the desired parameters. Specifically, the gain bandwidths for the most promising of these lasers are limited, e.g., Erbium based lasers have gain bandwidths of about 30 nm to about 100 nm, SOA has a gain bandwidth of about 30 nm and ECDLs have gain bandwidths of about 100 nm. These gain bandwidths make it impossible to provide for tuning ranges up to 250 nm or more. Furthermore, these laser sources are not sufficiently simple in construction, versatile, and economical. Combining a number of them, e.g., stitching together several ECDLs to cover a tuning range of 250 nm, is not a practical solution. This is because it is difficult to control the tuning behavior or achieve accurate wavelength control of combined sources. Furthermore, combined sources can not be tuned as rapidly as some applications require. Also, an implementation including a combination of multiple sources is generally more expensive relative to a single source which covers the required wavelength range.

In order to generate light in certain wavelength ranges where laser sources are not available (e.g., due to lack of lasing media generating light in those wavelength ranges at sufficient power levels) the prior art prescribes the use of nonlinear optics methods. Nonlinear optics encompass various processes by which a nonlinear optical material exhibiting a certain nonlinear susceptibility converts input light at an input wavelength to output light at an output wavelength in the difficult to access wavelength range. Some well-known nonlinear processes involving light at two or more wavelengths (e.g., three-wave mixing and four-wave mixing) include second harmonic and higher harmonic generation, difference frequency generation, sum frequency generation and optical parametric generation. The fundamentals of nonlinear optical processes are discussed extensively in literature and the reader is referred to Amnon Yariv, *Quantum Electronics*, $2^{nd}$ edition, Wiley Press, 1967 for general information.

Specific methods and devices using nonlinear wavelength conversion to produce light sources are also taught by the prior art. For example, M. H. Chou et al., "1.5-$\mu$m-band wavelength conversion based on difference-frequency generation in LiNbO$_3$ waveguides with integrated coupling structures", Optics Letters, Vol. 23, No. 13, Jul. 1, 1998 teach optical frequency mixing in the 1.5 $\mu$m wavelength band for telecommunication purposes. Additional information related to nonlinear wavelength conversion for communications applications can be found in I. Brenner et al., "Cascaded $\chi^{(2)}$ wavelength converter in LiNbO$_3$ waveguides with counter-propagating beams", Electronics Letters, Vol. 35, No. 14, Jul. 8, 1999; and M. H. Chou et al., "Stability and bandwidth enhancement of difference frequency generation (DFG)-based wavelength conversion by pump detuning", Electronics Letters, Vol. 36., No. 12, Jun. 10, 1999.

The output light from nonlinear wavelength converters can be tuned over a certain wavelength range. In general, control of the wavelengths of the mixing or interacting light beams can be used to adjust the output wavelength. When the nonlinear conversion process takes place in materials specially engineered to achieve high nonlinear conversion efficiencies, e.g., materials using quasi-phase-matching (QPM) gratings in in-diffused waveguides, control over certain grating parameters (i.e., the phasematching condition) can be employed to achieve output wavelength tuning. For general information on this subject the reader is referred to Michael L. Bortz's Doctoral Dissertation entitled "Quasi-Phasematched Optical Frequency Conversion in Lithium Niobate Waveguides", Stanford University, 1995 as well as M. L. Bortz et al., "Increased Acceptance Bandwidth for Quasiphasematched Second Harmonic Generation in LiNbO$_3$ Waveguides", Electronics Letters, Vol. 30, Jan. 6, 1994, pp. 34–5. Additional information on devices using QPM gratings for nonlinear conversion in found in U.S. Pat. No. 5,875,053. The processes used to make QPM gratins are described in U.S. Pat. Nos. 5,800,767 and 6,013,221, and waveguides with QPM gratings employed for nonlinear optical processes are described in U.S. Pat. No. 5,838,720.

Some specific high power pumped mid-IR wavelength systems using non-linear frequency mixing to obtain tunable light sources are taught by Sanders et al. in U.S. Pat. No. 5,912,910. In particular, the inventors teach the use of a narrowly tunable difference frequency generation and widely tunable optical parametric oscillation for generating output light in the desired mid-IR wavelength range. The phasematching bandwidth (e.g., of the QPM grating) is used for output bandwidth control for the OPO case. Unfortunately, due to their construction and the use of phasematching bandwidth for output linewidth control the OPO light sources of Sanders et al. still exhibit tuning instability due to mode-hopping as well as large output wavelength linewidths.

The use of optical parametric oscillation for producing a continuously tunable, short pulse and high repetition rate light source is also taught by Kent Burr et al., "High-repetition-rate femtosecond optical parametric oscillator based on periodically poled lithium niobate", Applied Physics Letters, Vol. 70, 1997, pg. 3343. The tuning bandwidth for the idler beam in this OPO extends from 1.68 $\mu$m to 2.72 $\mu$m and for the signal beam from 1.12 $\mu$m to 1.50 $\mu$m. Tuning is achieved by either temperature control of the nonlinear optical element within which OPO takes place, or tuning the wavelength of the pump beam driving the optical parametric oscillation or by adjusting the length of the cavity in which the nonlinear optical element was placed. Although low threshold for generation of output light in the form of the idler beam was achieved, these methods of controlling the OPO process do not yield a sufficiently stable and continuously tunable narrow linewidth output light desired. Furthermore, the process tends to set up double resonance (of both the idler beam and the signal beam) within the cavity when the signal and idler wavelengths are near 1560 nm. Above that, the system taught is large and bulky. Finally, the use of OPO for a tunable source is again addressed by Mark A. Arbore et al. in "Singly resonant optical parametric oscillation in periodically poled lithium niobate waveguides", Optics Letters, Vol. 22, No. 3, Feb. 1, 1997. In this case the resonant cavity is singly resonant (only at the signal wavelength) and the output wavelength (signal or idler wavelength) is efficiently generated and tuned over several hundreds of nanometers in bandwidth. The OPO is performed close to degeneracy at which the wavelengths of the signal and idler beams are equal, and the pump has half the wavelength of the signal or idler beam. Although this teaching goes far in providing a widely tunable and fairly stable light source using OPO, its output still suffers from instability and insufficiently narrow output linewidth. In fact, the output linewidth was about 4 nm, about 1,000 times too large for any practical application to swept wavelength testing, and the axial mode spacing was 2.6 GHz, causing mode-hops.

In view of the foregoing, there is still an unfilled need for a stable, simple and tunable light source having a wide tuning range, preferably over 250 nm, and a narrow output linewidth. Specifically, there is a need for an efficient, economical and widely tunable light source which can be used for practical applications in various fields of optics.

OBJECTS AND ADVANTAGES

It is therefore a primary object of the present invention to provide a tunable light source which has a wide tuning range, preferably in excess of 250 nm, over which the output wavelength is stable and can be continuously tuned.

It is a further object of the invention to take advantage of the nonlinear process of optical parametric oscillation to obtain the tunable light source.

Furthermore, it is also an object of the invention to ensure that the tunable source is easy to make and control, as well as economical and well-suited for practical applications.

These and other objects and advantages of the invention will become apparent upon further reading of the specification.

SUMMARY

The objects and advantages are achieved by a tunable light source equipped with an optical parametric amplifier (OPA) placed in a cavity for performing an optical parametric oscillation (OPO) involving a signal beam and an idler beam. The optical parametric oscillation is driven by a pump beam at a pump frequency provided to the OPA from a pump arrangement. The pump frequency is within a certain range such that the OPO is driven near degeneracy. In other words, the pump frequency is chosen such that the frequencies of the signal and idler beams are close (degeneracy being defined as the point at which these two frequencies are equal). The pump frequency tuning range expressed in terms of a wavelength tuning range is about 1.5 nm around degeneracy. The tunable source has an adjustment mechanism for adjusting the pump frequency within this wavelength tuning range and to thereby select a gain spectrum of the OPO. This gain spectrum is represented by the wavelength ranges over which the idler and signal beams experience gain. Additionally, the tunable light source has a spectral control mechanism for setting a resonant frequency of the cavity within the gain spectrum.

Conveniently, the spectral control mechanism is a narrowband tuner with its passband set or centered at the resonant frequency. The narrowband tuner can be a diffraction grating filter, a tunable fiber Bragg grating, dielectric coated mirrors, dielectric coated filters or an etalon filter. In addition to serving the primary function of selecting a particular resonant frequency within the gain spectrum, the spectral control element is also conveniently set to reject one of the idler and signal beams. In other words, only one of the idler and signal beams within the passband set by the narrowband tuner, i.e., at the resonant frequency is supported inside the cavity.

In the same or in another embodiment the cavity is a multiple axial mode cavity such that it supports a number of axial modes at the resonant frequency. The cavity can be a standing-wave type cavity or a ring cavity. Preferably, the cavity includes an optical fiber and is longer than 1 meter. It is also preferred, that the cavity be used in conjunction with the narrowband tuner for controlling the resonant frequency within the cavity.

The pump arrangement for supplying the pump beam for driving the OPO can take on any number of forms. However, it is most convenient to obtain the pump beam by relying on the nonlinear operation of second harmonic generation (SHG) to frequency double a primary beam. Thus, the pump arrangement has a light source for producing the primary beam and a second harmonic generator for receiving and frequency doubling the primary beam to produce the pump beam. The pump arrangement can also include a suitable optical amplifier, e.g., a fiber amplifier, for amplifying the primary beam.

When a second harmonic generator is used to obtain the pump beam it is convenient that both the second harmonic generator and the optical parametric amplifier be contained in the same nonlinear optical converter. This goal can be accomplished since the same nonlinear materials can be used for both second harmonic generation and optical parametric oscillation. After second harmonic generation produces the pump beam the primary beam is no longer needed. Therefore, a wavelength filter can be positioned between the second harmonic generator and the optical parametric amplifier for filtering the primary beam. Suitable wavelength filters for this purpose include a spatial mode filter, a grating, a fiber Bragg filter, a low pass filter, a directional coupler, a dichroic dielectric mirror, a grating-assisted coupler and an absorptive filter. Alternately, the residual primary beam could be further used, for example in a resonant multiple-pass configuration. In this case, the intervening filter should be chosen to provide separation of the primary beam with low loss.

In one embodiment the second harmonic generator has a first quasi-phase-matching (QPM) grating in the nonlinear optical converter and the optical parametric amplifier has a second quasi-phase-matching grating in the same nonlinear optical converter. Appropriate grating parameters are selected for phasematching the second harmonic generation and optical parametric amplification in the first and second QPM gratings, respectively. The first QPM grating for performing the second harmonic generation can be a grating with a uniform grating period or an aperiodic grating period. Preferably, the length and/or pattern of this first QPM grating is sufficient to enable efficient second harmonic generation over a bandwidth of at least 2 nm and preferably more than 3 nm for the primary beam. In addition, the two QPM gratings can be separated by a certain distance and an optical coupler can be disposed between the first and second QPM gratings for coupling in the signal beam and/or idler beam for the optical parametric amplification taking place in the second QPM grating. In this or another embodiment, it is advantageous that the QPM gratings be distributed in a waveguide fabricated in the nonlinear optical converter.

The tunable light source also has an output coupler for out-coupling at least one of the signal and idler beams. Depending on the operation, either the signal or the idler beam (or even both) can be used as the useful output of the tunable light source.

In one embodiment, the tunable light source is additionally equipped with a wavelength sweep control. The wavelength sweep control coordinates the adjustment of the pump frequency, which sets the gain spectrum, with the selection of the resonant frequency by the spectral control mechanism. Specifically, the sweep control coordinates a scan or sweep of the resonant frequency across a wavelength window. The wavelength window can have a bandwidth of 250 nm or more. For example, in swept wavelength testing applications the wavelength window can be 250 nm centered at approximately 1550 nm. Also, for the purposes of swept wavelength tests the passband for the resonant frequency can be set between 0.1 to 1000 pm, resulting in 0.1 to 100 pm output spectrum width. Furthermore, in some embodiments the tunable light source has a synchronizing unit connected to the pump arrangement for synchronizing the pump beam with a round-trip time of the cavity.

In a particular embodiment, the tunable light source is used in a swept wavelength system. The swept wavelength system preferably includes the wavelength sweep control for performing optical tests.

In another embodiment of the swept wavelength system the tunable light source has the nonlinear optical converter placed in the cavity for performing a nonlinear frequency conversion other than optical parametric amplification. For example, the nonlinear frequency conversion operation can be second harmonic generation, difference frequency generation or sum frequency generation. In all of these embodiments the nonlinear optical converter has a QPM grating for phase matching the nonlinear frequency conversion.

The present invention also provides for a method for tuning the light source using the OPA for obtaining a widely tunable output. Specifically, the method calls for producing the pump beam at the pump frequency and delivering the pump beam to the OPA for driving the optical parametric oscillation involving the idler and signal beams. Furthermore, the method calls for adjusting the pump frequency to select a gain spectrum for the OPO and setting the resonant frequency of the cavity within this gain spectrum. The OPO is then driven near degeneracy by the pump beam. The wavelength tuning range for the pump beam is approximately 1.5 nm around degeneracy.

In one embodiment, the spectrum control is achieved by establishing a passband for at least one of the idler and signal beams. In some embodiments the passband is set between 0.1 pm and 1000 pm. In the embodiments where the passband is obtained with the aid of a narrowband tuner, the tuner can be additionally used to remove one of the idler and signal beams. This removal can be based on which beam is the useful output of the tunable light source. The narrowband tuner can also be used to remove one or both of the primary beam or pump beam.

The pump beam can be delivered to the OPA in several formats. Specifically, the pump beam can be a continuous-wave beam or a pulsed beam. For example, in the event of a pulsed beam, the beam can have a duty cycle (on time) ranging from 1% to 50%. Duty cycle is defined as the pulse duration divided by the interpulse time. Of course, other duty cycle ranges can also be used, although they may result in widening of the resonant frequency bandwidth, slow tuning, low pulse frequency or all of these. In a preferred embodiment of the method, the pump beam is pulsed and synchronized with a round-trip time of the cavity. For example, the pulse repetition time of the pump beam can be synchronized to equal the cavity round-trip time, an integral number of round trip times or an integral fraction of a round-trip time. The pulse repetition time can also be adjusted to be many times longer than the round-trip time, e.g., to obtain quasi-continuous-wave operation of the light source. The pulse repetition time and pulse length can also be adjusted to provide a quasi-continuous-wave output with regard to the system using the source. This can be done by making the pulse repetition rate high relative to the frequency sensitivity of the system, or by making the pulse long relative to the response time of the system. The former is commonly referred to as "quasi-cw", while the latter is commonly referred to as "quasi-static", and the former is preferred.

In operating the tunable light source the point of degeneracy is avoided. Specifically, the tunable light source is preferably operated near degeneracy but within a certain offset from degeneracy itself. Specifically, operation in a region where the separation between signal beam and idler beam is comparable to or less than the passband of the spectral control mechanism is avoided. Thus, for example, the offset can range from 1 to 1000 pm and preferably from 50 pm to 500 pm.

As will be apparent to a person skilled in the art, the invention admits of a large number of embodiments and versions. The below detailed description and drawings serve to further elucidate the principles of the invention and some of its embodiments.

DETAILED DESCRIPTION

Figure 1:
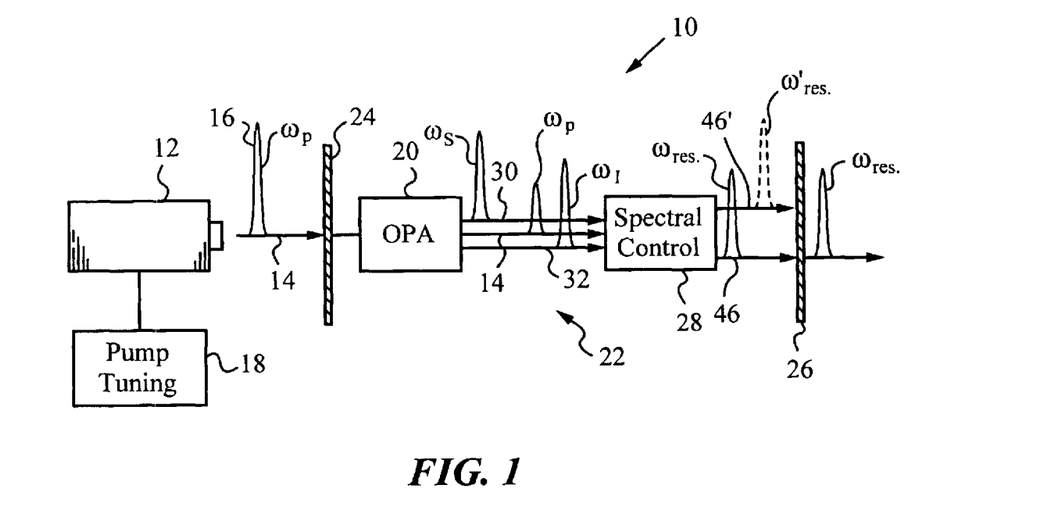
FIG. 1 is a simplified diagram illustrating the essential parts of a tunable light source according to the invention.

The fundamentals of the invention will be best understood by initially referring to a tunable light source 10 in accordance with the invention, as shown in FIG. 1. Light source 10 has a pump arrangement 12 for providing a pump beam 14 at a pump frequency $\omega_p$. Pump beam 14 is pulsed and consists of individual pulses 16 (only one pulse 16 is shown for reasons of clarity). Pump arrangement 12 can employ a pulsed laser, e.g., a Q-switched laser able to provide sufficiently high power in primary beam 14, e.g., several hundred miliWatts of peak power in each of pulses 16. A person skilled in the art will recognize that it is also possible for pump arrangement 12 to employ a continuous-wave laser, a near-continuous-wave laser or an externally modulated cw laser, provided that it yields sufficient power levels for the frequency conversion operations described below.

Light source 10 has an adjustment mechanism 18 connected to pump arrangement 12 for adjusting pump frequency $\omega_p$ of pump beam 14. Adjustment mechanism 18 can be any suitable device capable of controlling the temperature or any other parameter, e.g., cavity length of the laser used by pump arrangement 12, to tune pump frequency $\omega_p$ of pump beam 14. Specifically, more conveniently expressed in terms of a wavelength tuning range, pump beam 14 should be tunable by about 1.5 nm or more. In addition, adjustment mechanism 18 should be able to perform the tuning across this wavelength tuning range as rapidly as feasible, e.g., on the order of seconds or tens of seconds. A person skilled in the art will appreciate that any suitable technique for obtaining this tuning range in pulsed, near-continuous-wave and continuous-wave lasers can be applied to obtain the desired tuning range.

Light source 10 is equipped with an optical parametric amplifier (OPA) 20 positioned in a cavity 22. OPA 20 is made of a nonlinear optical material selected for its nonlinear susceptibility, i.e., its second order nonlinear susceptibility $\chi^{(2)}$, as well as any other requisite properties required for performing optical parametric amplification. OPA 20 also includes any suitable phasematching arrangement for phasematching the operation of optical parametric amplification within OPA 20.

Cavity 22 is delimited by two mirrors 24 and 26. Pump beam 14 is in-coupled into cavity 22 through mirror 24, which serves as the input coupler. Mirror 26 serves as the output coupler from cavity 22.

A spectral control mechanism 28 is also located inside cavity 22. Spectral control mechanism 28 is a narrowband tuner or any other suitable optical filtering device. Spectral control mechanism 28 is provided for setting a resonant frequency $\omega_{res.}$ of cavity 22 as discussed below.

Figure 2A:
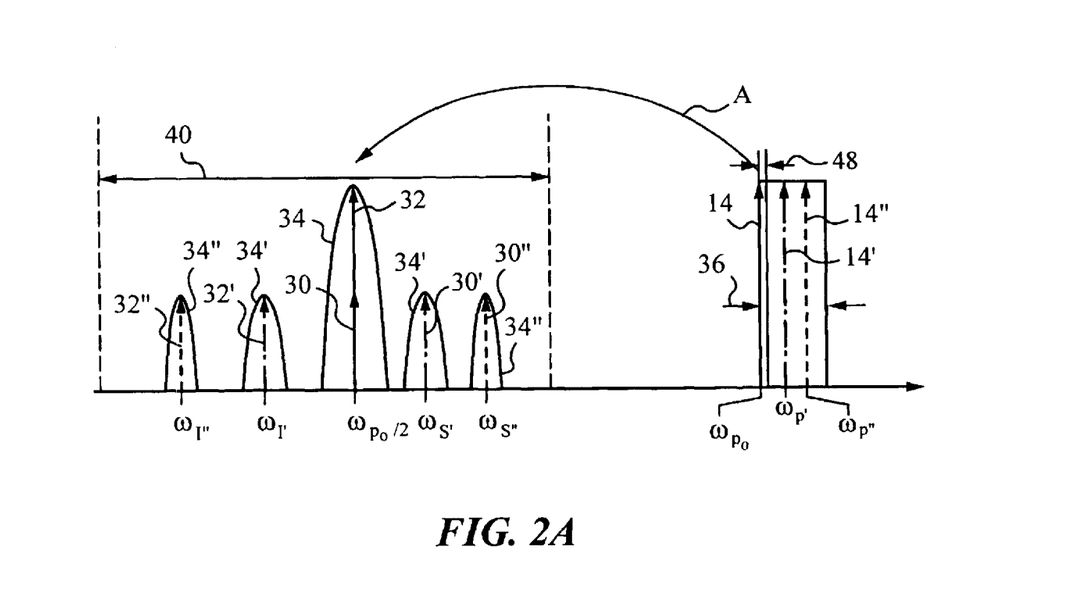
FIGS. 2A–C illustrate the fundamentals of the operation of the tunable light source of FIG. 1
Figure 2B:
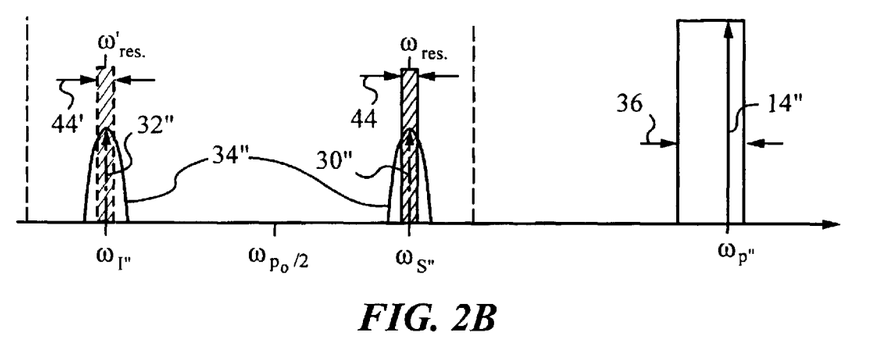

The operation of tunable light source 10 will be best understood by initially reviewing FIGS. 2A and 2B. OPO is a process during which pump beam 14 at pump frequency $\omega_p$ transfers power to a signal beam 30 at frequency $\omega_S$ and to an idler beam 32 at frequency $\omega_I$ according to the equation:

$$\omega_p = \omega_S + \omega_I.$$

The process is performed such that energy and momentum are conserved between the photons constituting the three interacting beams. In the case where $\omega_S = \omega_I = \omega_{p/2}$ the OPO is called degenerate and is essentially the opposite of second harmonic generation (SHG), such that:

$$\omega_p = 2\omega_{p/2}.$$

In other words, degeneracy is encountered when frequency $\omega_S$ of signal beam 30 and frequency $\omega_I$ of idler beam 32 are equal to each other, and therefore equal to half of pump frequency $\omega_p$ of pump beam 14 which is driving the OPO. This condition is illustrated in FIG. 2A, where the corresponding pump frequency $\omega_{po}$ of pump beam 14 indicated by a solid arrow produces signal beam 30 and idler beam 32 indicated by two solid arrows both at frequency $\omega_{po/2}$ ($\omega_S = \omega_I = \omega_{po/2}$).

Reviewing this situation in still more detail we find that pump beam 14 at the specific pump frequency $\omega_{po}$ OPO exhibits gain within a gain spectrum 34. In other words, when OPA 20 is driven by pump beam 14 at the specific pump frequency $\omega_{po}$, OPA 20 offers gain for signal and idler beams 30, 32 within gain spectrum 34. In FIG. 2A signal and idler beams 30, 32 are indicated by arrows at the maximum of gain spectrum 34 centered at one half of the pump frequency or at $\omega_{po/2}$.

When pump beam 14 is tuned by adjustment mechanism 18 gain spectrum 34 for OPO within OPA 20 shifts. For example, for two specific pump beams designated by 14' and 14'' and associated with pump frequency values $\omega_{p'}$ and $\omega_{p''}$ gain spectrum 34 of OPA 20 is shifted to 34' and 34'', respectively. Gain spectra 34', 34'' each have two separate gain regions in which signal beams 30', 30'' and idler beams 32', 32'' experience gain. The corresponding signal and idler frequencies $\omega_{S'}$, $\omega_{S''}$ and $\omega_{I'}$, $\omega_{I''}$ are indicated as center frequencies of gain spectra 34', 34''.

According to the invention, mechanism 18 tunes pump frequency $\omega_p$ over a range conveniently expressed in terms of wavelength as a wavelength tuning range 36. Tuning range 36 corresponds to about 1.5 nm around degeneracy. As pump frequency $\omega_p$ is tuned over tuning range 36 the gain spectrum for signal and idler beams 30, 32 shifts, as discussed above. In fact, as pump frequency $\omega_p$ sweeps over entire tuning range 36, gain spectrum covers a frequency range conveniently expressed in the form of a wavelength window 40. For tuning range 36 of 1.5 nm, wavelength window 40 is about 250 nm wide. Of course, extending tuning range 36 past 1.5 nm will enlarge wavelength window 40. It should be noted, however, that using pump frequency $\omega_p$ considerably outside tuning range 36 will reduce or even eliminate the advantages of the invention.

FIG. 2B illustrates the operation of spectral control mechanism 28 in the particular case of pump beam 14'' tuned to pump frequency $\omega_{p''}$. At pump frequency $\omega_{p''}$ one obtains gain spectrum 34'' with two gain portions centered at the indicated signal and idler frequencies $\omega_{S''}$ and $\omega_{I''}$ corresponding to signal and idler beams 30'', 32''. In accordance with the invention, a passband 44 of spectral control mechanism 28 is used to choose a resonant frequency $\omega_{res.}$ of cavity 22 within gain spectrum 34''. In other words, passband 44 selects a portion of gain spectrum 34'' within which cavity 22 will support a resonant beam 46 (see FIG. 1) at resonant frequency $\omega_{res.}$. In the present embodiment, passband 44 covers a portion of gain spectrum 34'' centered at signal frequency $\omega_{S''}$. Thus, resonant frequency $\omega_{res.}$ supported by cavity 22 corresponds to the central narrowband portion of gain spectrum 34''. In fact, the center frequencies for signal beam 30'' and resonant beam 46 are equal.

Preferably, passband 44 is very narrow, e.g., in the range of 0.1 pm to 1000 pm. Thus, only about 0.1 pm to 1000 pm of signal beam 30'' represents resonant beam 46. It should be noted that with passband 44 set for only one resonant frequency $\omega_{res.}$ cavity 22 is singly resonant; i.e., only single resonant beam 46 is supported. A person skilled in the art will recognize that proper positioning of passband 44 within gain spectrum 34'' allows the user to select narrowband portions of either signal beam 30'', or idler beam 32'', as resonant beam 46.

In some embodiments spectral control mechanism 28 has a second passband 44' centered on a portion of gain spectrum 34'' at idler frequency $\omega_{I''}$, as indicated in FIG. 2B. In this case two resonant beams 46, 46' at resonant frequencies $\omega_{res.}$ and $\omega'_{res.}$ are supported by cavity 22, which is now doubly resonant. In general, and especially when operating light source 10 close to degeneracy, as defined below, singly resonant cavity 22 is preferred and in this case resonant beam 46 is the only useful beam out-coupled from cavity 22 through output coupler 26.

The mathematical definition of degeneracy has been previously provided and corresponds to the operating point where pump, signal and idler beams are related by $\omega_S = \omega_I = \omega_{p/2} = \frac{1}{2}\omega_p$. Herein, the working definition of degeneracy is the operating condition when pump frequency $\omega_p$ of pump beam 14 and passband 44 are related such that the frequency $\frac{1}{2}\omega_p$ or $\omega_{p/2}$ is included within passband 44. This means that the wavelength separation between signal and idler beams 30, 32 should be maintained at least equal and preferably larger than passband 44 to which resonant frequency $\omega_{res.}$ is confined.

Under the above definition degeneracy already occurs when pump frequency $\omega_p$ is within an offset 48 from mathematical degeneracy at pump frequency $\omega_{po}$ as indicated in FIG. 2A. In most cases offset 48 will be on the order of 100 pm. A person skilled in the art will recognize, however, that offset 48 will vary based on many factors such as the width of passband 44 set by spectral filter 28, the spectral filter shape and the loss of cavity 22. Hence, the quality of resonant beam 46 output from cavity 22 can be used as an empirical measure to determine offset 48 from $\omega_{po}$ for pump frequency $\omega_p$.

In accordance with the invention, light source 10 is operated such that the OPO is driven near degeneracy. In terms of pump wavelength, the region of near degeneracy extends from the value of pump frequency at offset 48 to the value of pump frequency at the end of tuning range 36. The region outside tuning range 36 is considered far from degeneracy.

Clearly, resonant beam 46 at resonant frequency $\omega_{res.}$ can be set for any frequency within wavelength window 40 by first tuning pump frequency $\omega_p$ to produce gain at the desired signal frequency $\omega_S$ or idler frequency $\omega_I$ and then setting passband 44 centered at the desired resonant frequency $\omega_{res.}$. Since the gain spectrum is set with the aid of adjustment mechanism 18 and passband 44 is selected with the aid of spectral control mechanism 28 their operation should be coordinated. In this manner resonant beam 46 can be made to sweep the entire wavelength window 40 of about 250 nm. The speed of this sweep will depend on the speed with which adjustment mechanism 18 can adjust pump wavelength $\omega_p$ and the speed with which spectral control mechanism 28 is able to set passband 44 at the desired resonant frequency $\omega_{res.}$.

Figure 2C:
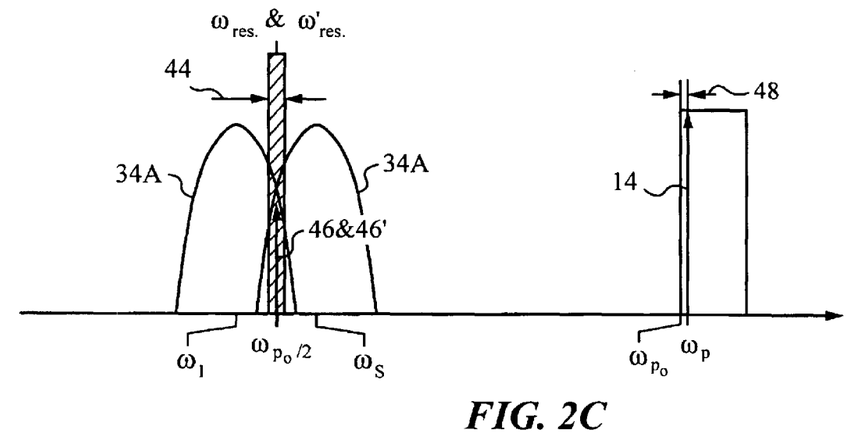

It is important to note that wavelength window 40 is not discontinuous at degeneracy and resonant beam 46 near and strictly at degenerate frequency $\omega_{po/2}$ can be generated by light source 10. For this purpose, $\omega_{res.}$ is tuned through degeneracy and even set at $\omega_{po/2}$ while not using pump frequency $\omega_{po}$ (at which strict degeneracy is encountered) to drive the OPO. Pump frequency $\omega_p$ of pump beam 14 is set by adjustment mechanism 18 at offset 48 to produce gain spectrum 34A, as illustrated in FIG. 2C. Now, spectral control mechanism 28 sets passband 44 centered on $\omega_{po/2}$ such that $\omega_{po/2} = \omega_{res.}$. Thus, resonant beam 46 output from cavity 22 is at frequency $\omega_{po/2}$. However, OPO is not mathematically degenerate because $\omega_{res.} \neq \omega_{p/2}$. If $\omega_p < \omega_{po}$, then $\omega_{res.}$ is $\omega_s$ and $\omega_i < \omega_{res.}$. If $\omega_p > \omega_{po}$, then $\omega_{res.}$ is $\omega_i$ and $\omega_s > \omega_{res.}$. In either case, OPA 20 is not mathematically degenerate and the source is not operating as a doubly-resonant OPO or DRO.

Tunable light source 10 of the invention thus provides a continuously and widely tunable output in the form of resonant beam 46. The wavelength window 40 over which resonant beam 46 is tunable is sufficiently large for applications in many fields of optics, including communications and swept wavelength testing. The components and principles of operation of light source 10 can be modified in many ways to suit the particular performance characteristics desired.

Figure 3:
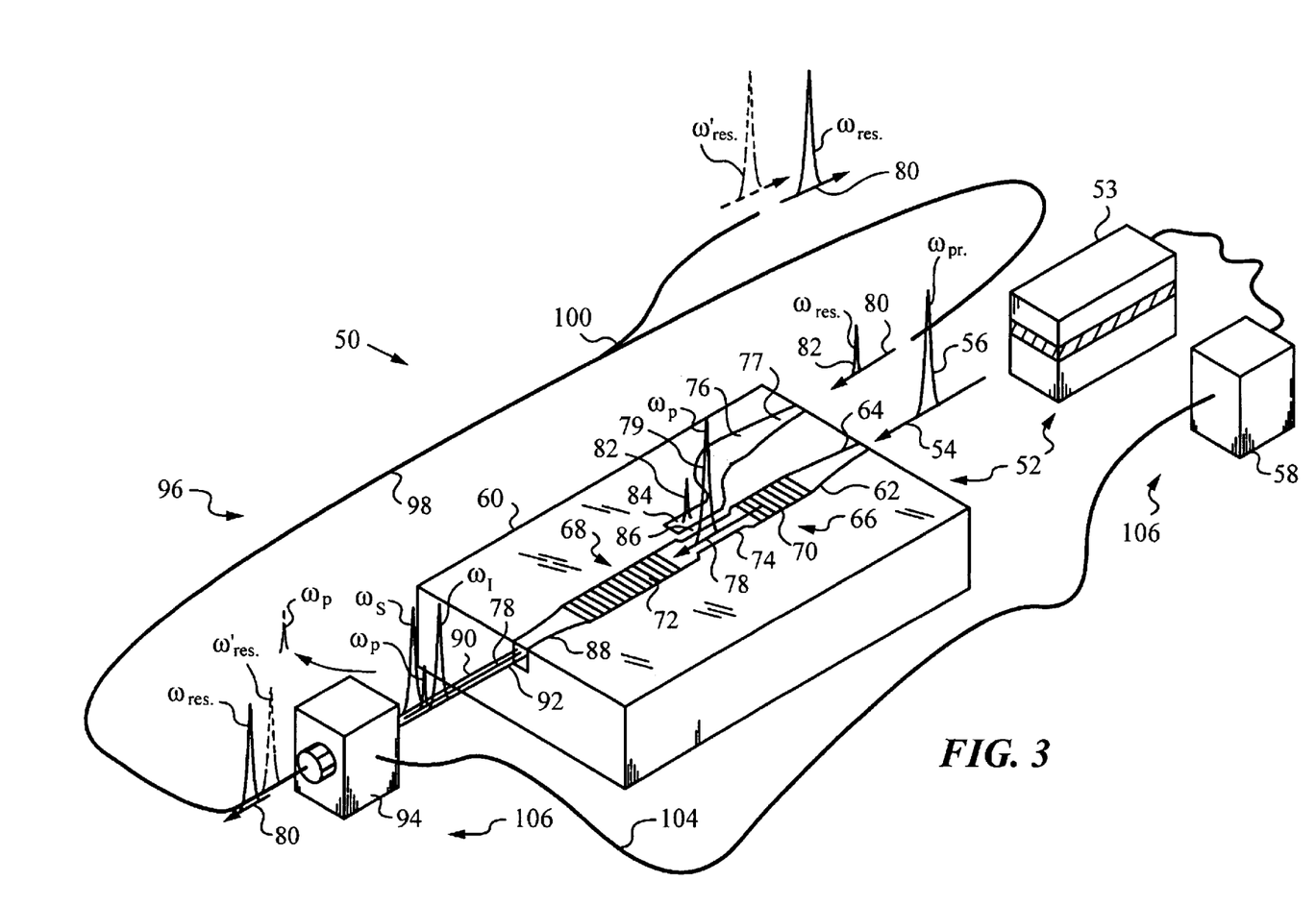
FIG. 3 is an isometric view illustrating a preferred embodiment of a tunable light source according to the invention.

FIG. 3 illustrates a preferred embodiment of a tunable light source 50 with pump arrangement 52 employing a directly modulated diode laser 53 centered at wavelength of about 1530 nm. Diode laser 53 produces a primary beam 54 at a primary frequency $\omega_{pr.}$. An adjustment mechanism 58 tunes primary frequency $\omega_{pr.}$ and modulates diode laser 53 to emit in pulses 56 (only one pulse shown for reasons of clarity).

A nonlinear optical converter 60 is positioned in the path of primary beam 54. Nonlinear optical converter 60 is made of a nonlinear optical material such as $LiNbO_3$ and has a first waveguide 62 with an in-coupling section 64, in this case in the form of a taper, for in-coupling primary beam 54. Conveniently, waveguide 62 is an annealed proton-exchanged waveguide produced in $LiNbO_3$. Nonlinear optical converter 60 contains a second harmonic generator (SHG) 66 followed by an optical parametric amplifier (OPA) 68, both positioned inside waveguide 62.

SHG 66 is a part of pump arrangement 52 and is intended for frequency doubling primary beam 54 obtained from diode laser 53 to generate a pump beam 78. Specifically, SHG 66 has a quasi-phase-matching (QPM) grating 70 for phasematching the nonlinear operation of generating second harmonic (SH) beam 78 of primary beam 54. Thus, SHG 66 converts pulses 56 of primary beam 54 at $\omega_{pr.}$ into pulses 79 of second harmonic beam 78 at pump frequency $\omega_p = 2\omega_{pr.}$.

OPA 68 has a QPM grating 72 for phasematching the nonlinear operation of optical parametric amplification. It will be appreciated by a person skilled in the art that various types of nonlinear optical materials other than $LiNbO_3$ exhibiting suitable nonlinear susceptibility, i.e., second order nonlinear susceptibility $\chi^{(2)}$, as well as other requisite properties, e.g., the ability to support QPM gratings (or other phasematching techniques) and waveguides, can be used to make nonlinear optical converter 60. It will also be appreciated by a person skilled in the art that phasematching techniques not involving QPM gratings 70, 72, e.g., birefringence phase matching or waveguide modal phasematching can be employed for phasematching in SHG 66 and OPA 68.

A wavelength filter 74 is located between SHG 66 and OPA 68 for removing or filtering out primary beam 54 from first waveguide 62 before OPA 68. Filter 74 is used to prevent primary beam 54 from entering OPA 68 in the event primary beam 54 would interfere with optical parametric amplification driven by pump beam 78. A person skilled in the art will recognize that filter 74 will become less useful (and can be completely left out) the further away from degeneracy the OPO is performed. Suitable wavelength filters for this purpose include spatial mode filters, gratings, fiber-Bragg filters, low pass filters, directional couplers, dichroic dielectric mirrors, grating-assisted couplers and absorptive filters. In the present embodiment wavelength filter 74 is a directional coupler.

Nonlinear converter 60 also has a second waveguide 76 with an in-coupling section 77 for in-coupling a resonant beam 80 at resonant frequency $\omega_{res.}$ arriving in pulses 82. In-coupling section 77 is in the form of a taper in second waveguide 76. Second waveguide 76 has a section 84 which extends along first waveguide 62, creating a coupling junction or directional coupler 86 between waveguides 62 and 76. Directional coupler 86 allows pulses 82 of resonant beam 80 to couple into waveguide 62 via the evanescent field coupling effect. Furthermore, directional coupler 86 is designed so that it does not perturb the second harmonic or pump beam 78. The mechanism of evanescent field coupling is well-known in the art. It should also be noted that methods and structures relying on physical processes other than evanescent field coupling, e.g., grating-assisted coupling, can be used for coupling resonant beam 80 into waveguide 62.

Nonlinear optical converter 60 has an output coupler 88 located at the end of first waveguide 62. Output coupler 88 is a narrowing taper in waveguide 62. A signal beam 90, an idler beam 92 and pump beam 78 emanating from OPA 68 are all out-coupled through output coupler 88. Narrowing taper 88 is conveniently used to mode-match and couple the three output beams 90, 92 and 78 into fiber for further transmission.

Tunable light source 60 has a spectral control mechanism 94 for controlling its spectrum. In the present embodiment, spectral control mechanism 94 is a narrowband tuner with a narrow passband, e.g., on the order of 100 pm, positioned after nonlinear converter 60. Narrowband tuner 94 is connected to adjustment mechanism 58. Narrowband tuner 94 can be a diffraction grating filter such as a TB9 series tunable optical grating filter available from JDS Uniphase, a tunable fiber Bragg grating, dielectric coated mirrors, dielectric coated filters or an etalon filter.

Nonlinear converter 60 and narrowband tuner 94 are located in a cavity 96. Conveniently, cavity 96 is a ring cavity employing a fiber loop 98. Alternatively, cavity 96 can be a standing-wave cavity, as is known to those skilled in the art. In any case, cavity 96 is preferably long enough to support a number of axial modes, thereby further aiding in the continuous tuning of light source 50. For example, cavity 96 has a length of at least 1 meter. Additionally, cavity 96 has an output coupler 100, here in the form of a y-junction fiber coupler. A person skilled in the art will recognize that fused fiber couplers as well as other output coupling elements can be employed in alternative embodiments.

Figure 4:
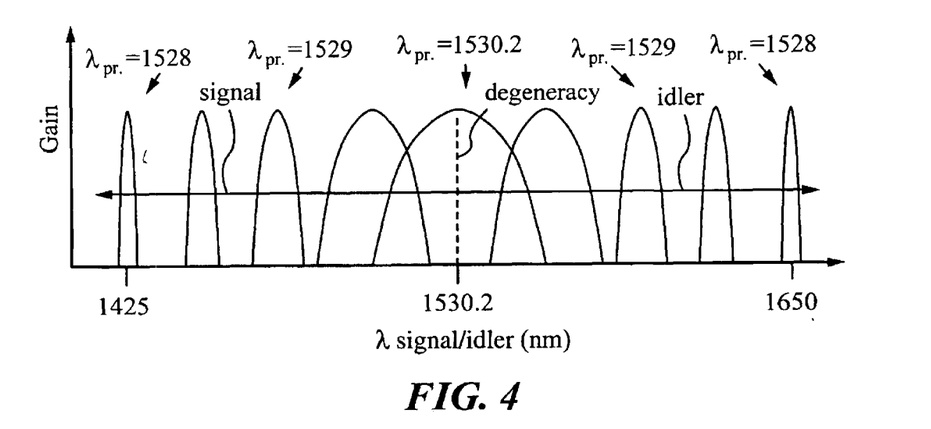
FIG. 4 is a graph illustrating the gain spectra for the light source of FIG. 3.

The operation of tunable light source 60 proceeds in accordance with the general principles explained above. With the aid of adjustment mechanism 58 a desired primary frequency $\omega_{pr.}$ is set for primary beam 54 emitted by diode laser 53. Primary beam 54 is in-coupled into waveguide 62 via taper 64. With the aid of QPM grating 70 primary beam 54 is efficiently frequency doubled in SHG 66 to yield pump beam 78 at pump frequency $\omega_p$. (Primary beam 54 does not enter OPA 68 since it is filtered out by wavelength filter 74 before OPA 68.) Pump frequency $\omega_p$, in turn, determines the gain spectrum for optical parametric oscillation in OPA 68. FIG. 4 illustrates the gain spectra in terms of wavelength for signal and idler beams 90, 92 in OPA 68. The gain spectra are indicated for several primary wavelengths $\lambda_{pr.}$ of primary beam 54 (rather than pump wavelengths $\lambda_p$ of pump beam 78). A person skilled in the art will appreciate that the actual gain spectra will differ for alternate nonlinear optical materials. OPA 68 driven by pump beam 78 exhibits gain for signal beam 90 and idler beam 92 at signal and idler frequencies $\omega_S$, $\omega_I$ (or, equivalently, at signal and idler wavelengths $\lambda_S$, $\lambda_I$) within the gain spectra dictated by primary wavelength $\lambda_{pr.}$. Narrowband tuner 94 sets a narrow passband, as explained above, within the gain spectrum for signal or idler beam 90, 92. This narrow passband defines resonant frequency $\omega_{res.}$ of resonant beam 80, containing a narrowband portion of either signal beam 90 or idler beam 92 supported by cavity 96. In other words, narrowband tuner 94 rejects one of beams 90, 92 and passes a narrowband portion of the other in the form of resonant beam 80. The choice of which beam to pass will be made based on whether idler beam 92 or signal beam 90 will be used as output of light source 50.

Resonant beam 80 travels through cavity 96 and a small portion, preferably just a few tens of percent of total power in resonant beam 80, is out-coupled through output coupler 100 for the desired application. Except for the out-coupled power, resonant beam 80 is recirculated in cavity 96 by fiber 98 back into nonlinear converter 60. Specifically, resonant beam 80 in-couples via taper 77 into waveguide 76 and then couples across directional coupler 86 into waveguide 62. Once back in OPA 68, resonant beam 80 experiences gain and is thus amplified on each round-trip through cavity 96.

The tuning of resonant beam 80 is also performed in accordance with the general principles explained above. Specifically, adjustment mechanism 58 changes primary wavelength $\lambda_{pr.}$ of diode laser 53 to shift the gain spectrum of OPO. At the same time, narrowband tuner 94 adjusts the location of the passband. In this manner, the new desired resonant frequency $\omega_{res.}$ is selected for resonant beam 80.

Conveniently, in this embodiment adjustment mechanism 58 and narrowband tuner 94 are in communication via a connection 104. In this combination, mechanism 58 and narrowband tuner 94 form a wavelength sweep control 106 for coordinated adjustment of primary wavelength $\lambda_{pr.}$ and hence of pump frequency $\omega_p$ and of resonant frequency $\omega_{res.}$. Preferably, narrowband tuner 94 keeps its passband centered at the desired resonant frequency $\omega_{res.}$ and mechanism 58 tunes pump frequency $\omega_p$ (by tuning primary frequency $\omega_{pr.}$) such that the passband remains centered at a maximum of the gain for either signal beam 90 or idler beam 92. By coordinating narrowband tuner 94 and mechanism 58 in this manner, wavelength sweep control 106 can be set to perform a continuous wavelength sweep across the wavelength window available to resonant beam 80.

Figure 5:
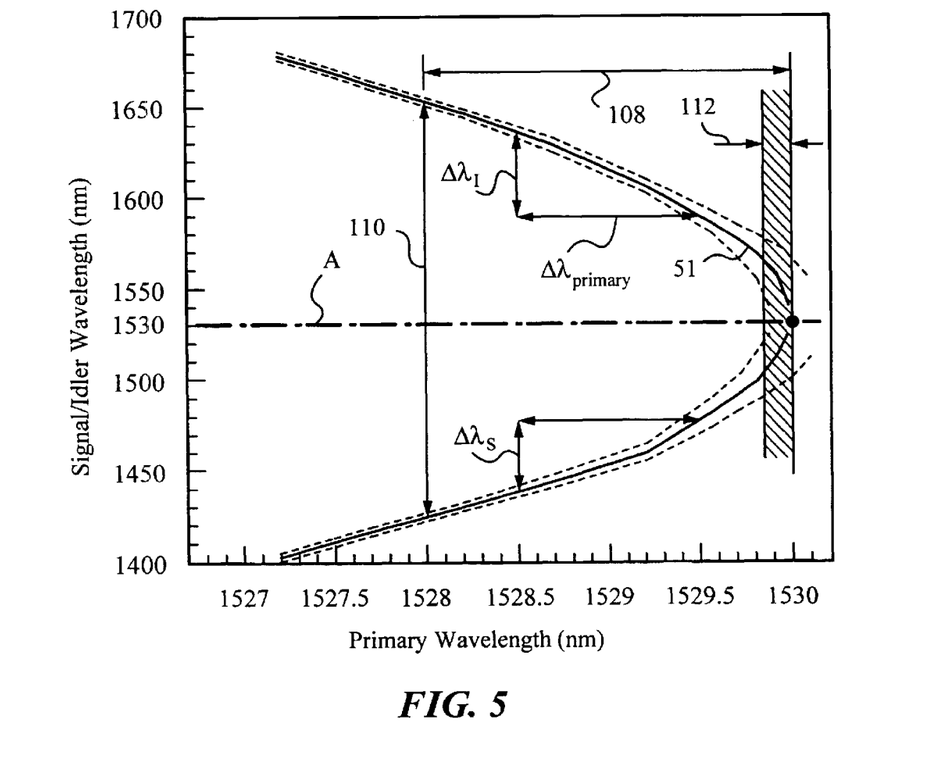
FIG. 5 is a graph illustrating the tuning behavior of the light source of FIG. 3.

Graph 51 in FIG. 5 illustrates the tuning behavior of signal beam 90 and idler beam 92 during OPO expressed in wavelengths, rather than frequencies. The wavelengths and wavelength ranges indicated in the graph are provided for explanatory purposes and will differ for alternate nonlinear optical materials (this plot based on dispersion of $LiNbO_3$). The dashed lines around graph 51 delimit a region of 3 dB gain for optical parametric amplification. A change of primary wavelength $\lambda_{pr.}$ by 2 nm corresponds to a change of 1 nm of pump wavelength $\lambda_p$ of pump beam 78. Line A indicates degeneracy at which signal wavelength $\lambda_S$ and idler wavelength $\lambda_I$ are equal to 1530 nm. At this point, primary wavelength $\lambda_{pr.}$ is also equal to 1530 nm and pump wavelength $\lambda_p$ is equal to 765 nm. A primary wavelength change $\Delta\lambda_{pr.}$ of merely 1 nm from 1530 nm to 1529 nm produces a pump wavelength change $\Delta\lambda_p$ of 0.5 nm and a corresponding signal wavelength change $\Delta\lambda_S$ of about 80 nm and an idler wavelength change $\Delta\lambda_I$ of also about 80 nm (since OPO is symmetric near degeneracy with respect to signal and idler beams 90, 92). In other words, 160 nm of tuning of signal and idler beams 90, 92 (in the form of resonant beam 80) is obtained with only 1 nm tuning of primary beam 54. Similarly, the 2.5 to 3.0 nm tuning range 108 of primary wavelength $\lambda_{pr.}$ provides light source 50 with wavelength window 110 of 260 to 300 nm of for resonant beam 80. A person skilled in the art will also note that the value of $\lambda_p$ has a wide range (≈300 pm) of acceptable values when $\lambda_S$ and $\lambda_I$ are within 1500–1580 nm.

The near degenerate operation results in a wide OPO gain bandwidth, while providing similar amount of gain to that obtained away from degeneracy. Also, near degenerate operation offers wide phasematching bandwidths for any type of phasematching used. Therefore, in the present, QPM grating 72 can be made long to improve the gain of the optical parametric amplification without sacrificing too much gain bandwidth or sacrificing any tuning bandwidth. Most importantly, however, since only a very small amount of tuning of pump wavelength $\lambda_p$ (in this case by directly tuning primary wavelength $\lambda_{pr.}$) results in a very large tuning of gain for signal and idler wavelengths $\lambda_S$, $\lambda_I$, the tuning operation can be performed rapidly.

As explained above, OPA 68 is not operated at degeneracy.

Rather, OPA 68 is only operated with $\lambda_s$ and $\lambda_i$ within about 100 pm of degeneracy. Thus, tuning range 108 does not include a narrow offset 112 of about 100 pm from degeneracy.

Since optical parametric amplification is typically a low gain process, confining interacting beams 90, 92 and 78 to first waveguide 62 is important for achieving high conversion efficiency. It is also important to make the length of OPA 68 and in particular the length of QPM grating 62 be as long as possible to achieve threshold and increase efficiency of the OPO. In addition, the power of pump beam 78 should also be high for efficient OPO. For example, the power level of pump beam 78 should allow for operation at two times threshold or above. A person skilled in the art will recognize that other changes can be made to ensure high conversion efficiency of the OPO (such as optimum output coupling and low loss).

Tunable light source 50 can be operated in continuous wave mode or pulsed mode. When operating tunable light source 50 in pulsed mode primary beam 54 is modulated. In particular, adjustment mechanism 58 not only tunes primary frequency $\omega_{pr.}$ but also modulates primary beam 54 to produce pulses 56 of a certain format. It is preferred, for efficient operation of OPA 68, that primary beam 54 have a duty cycle ranging from 1% to 50%. Of course, other duty cycle ranges can be utilized.

For efficient OPO, pump beam 54 is synchronized with a round-trip time of resonant cavity 96. This is done such that pulses 56 of primary beam 54 are synchronized with pulses 82 of resonant beam 80. In one embodiment pulses 56 can be emitted after each round trip of resonant pulse 82. Alternatively, pulses 56 are emitted at an integral fraction of the round trip time or an integer multiple of the round trip time.

Figure 6A:
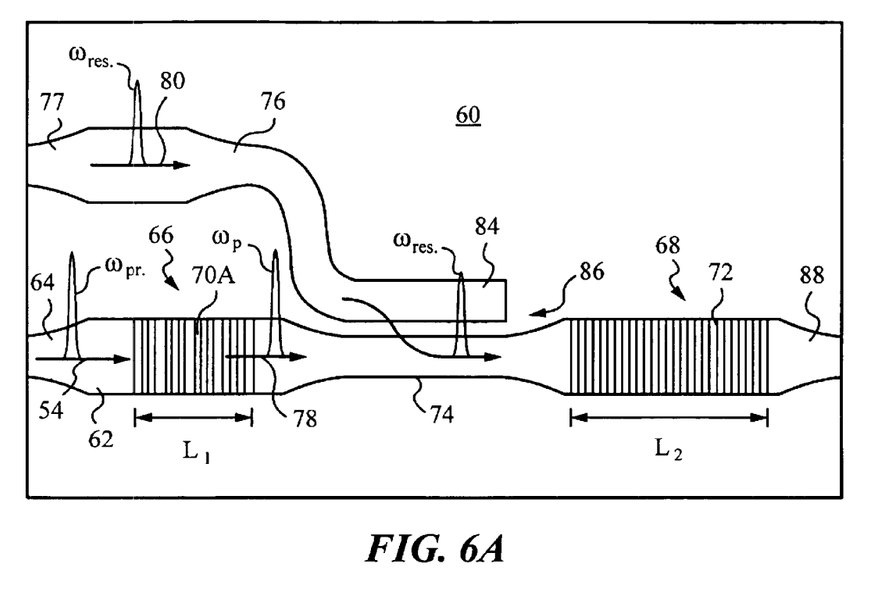
FIG. 6A is a plan view illustrating several details of the nonlinear optical converter used by the light source of FIG. 3.
Figure 6B:
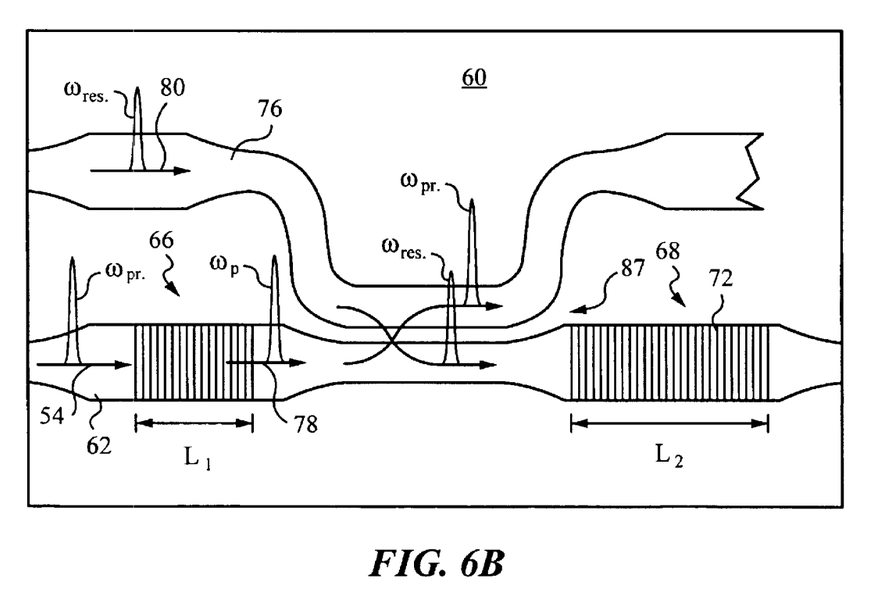
FIG. 6B is a plan view illustrating another embodiment of a nonlinear optical converter in accordance with the invention.

FIGS. 6A–B illustrate two alternative versions of arranging SHG 66 and OPA 68 in nonlinear converter 60. The same reference numerals are used to designate corresponding parts. In the embodiment of FIG. 6A second waveguide 76 terminates in section 84 at directional coupler 86 which couples resonant beam 80 into first waveguide 62. In contrast to the previous embodiment, SHG 66 has an aperiodic QPM grating 70A of length $L_1$ for converting primary beam 54 to pump beam 78. Aperiodic grating 70A is designed to convert primary beam 54 to pump beam 78 over the entire ≈3 nm tuning range of primary beam 54. Furthermore, length $L_1$ of QPM grating 70A can be kept short (on the order of 1 cm) in this embodiment. Short length $L_1$ preserves space in nonlinear converter 60 and makes available a longer length $L_2$ for QPM grating 72 in OPA 68.

In FIG. 6B directional coupler 86 is replaced by a directional coupler 87 serving a dual function. First, directional coupler 87 couples resonant beam 80 from waveguide 76 into waveguide 62. Second, directional coupler 87 couples residual primary beam 54 remaining in waveguide 62 after SHG 66 into waveguide 76. Residual primary beam 54 is guided away and damped in waveguide 76.

Figure 7:
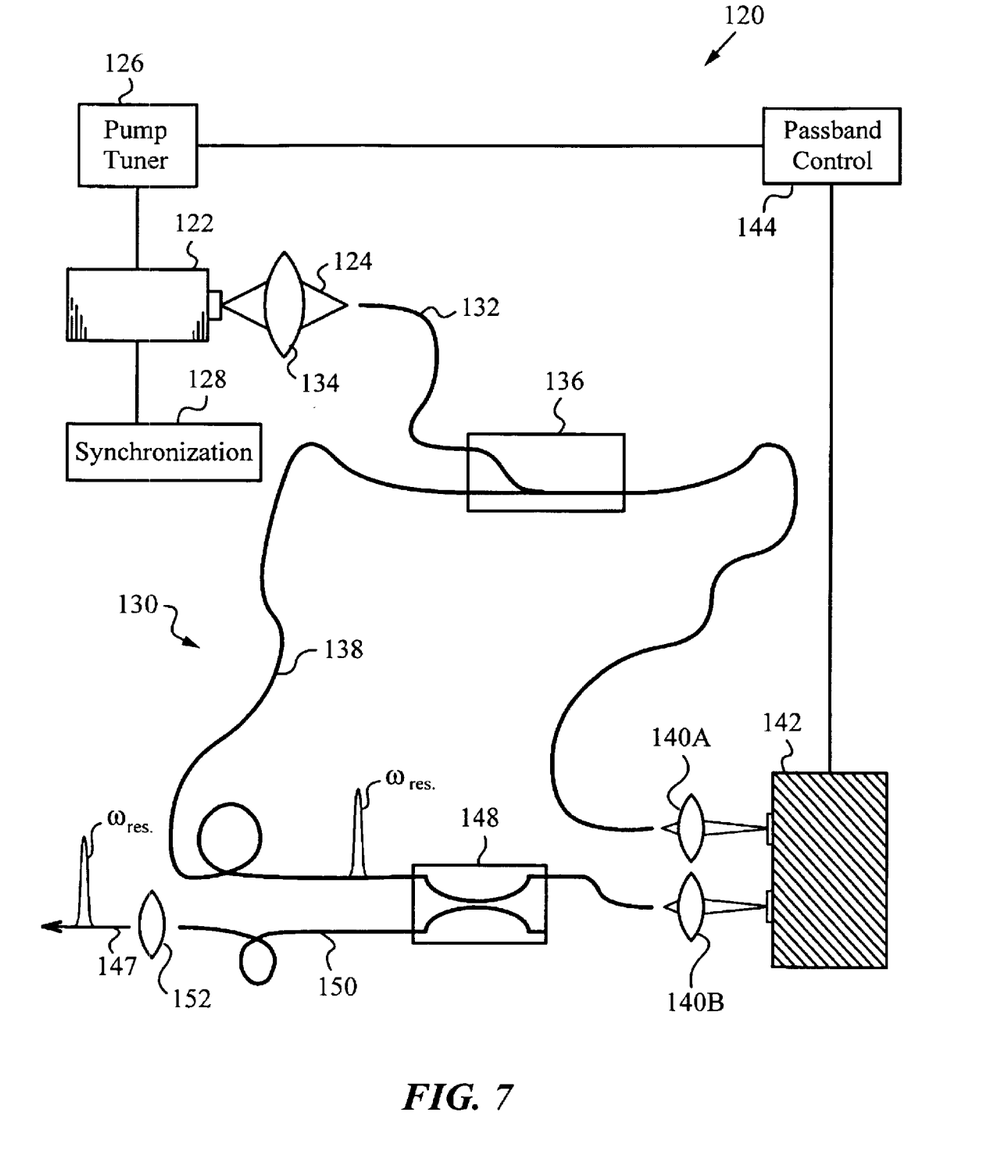
FIG. 7 is a diagram of another embodiment of a tunable light source according to the invention.

FIG. 7 illustrates another tunable light source 120 for near degenerate OPO. Light source 120 has a pump laser 122 delivering a primary beam 124 at primary frequency $\omega_{pr.}$. An adjustment mechanism or pump tuner 126 is provided to tune primary frequency $\omega_{pr.}$. A synchronization unit 128 is provided to synchronize the timing of pulses in pump beam 124 with a round trip time of a cavity 130.

Primary beam 124 is first in-coupled into a fiber amplifier 132 with the aid of a suitable optic 134, e.g., a lens. Amplifier 132 can be an Er-doped fiber amplifier (EDFA) or another suitable amplifier. Amplifier 132 delivers amplified primary beam 124 to a nonlinear converter 136, which performs second harmonic generation of primary beam 124 to derive a pump beam for driving optical parametric amplification. The details of nonlinear converter 136 are not specifically shown, as they are analogous to those of converter 60 of light source 50.

Cavity 130 has a fiber 138 which is coupled to nonlinear converter 136 and coupled with the aid of lenses 140A, 140B to a narrowband filter 142. A passband control 144 tunes the passband of filter 142 to select the desired resonant frequency $\omega_{res.}$ and pump tuner 126 adjusts pump frequency $\omega_p$ accordingly to adjust the gain spectrum. Pump tuner 126 and passband control 144 are connected such that their operation, i.e., the setting of the passband and adjustment of pump frequency $\omega_p$, are coordinated.

A resonant beam 146 established at resonant frequency $\omega_{res.}$ is out-coupled from cavity 130 with the aid of a directional coupler 148. Directional coupler 148 sends a portion of resonant beam 146 into a fiber 150, from which an out-coupled beam 147 at resonant frequency $\omega_{res.}$ is obtained. Out-coupled beam 147 can be collimated or focused, as required, with the aid of a lens 152.

Figure 8:
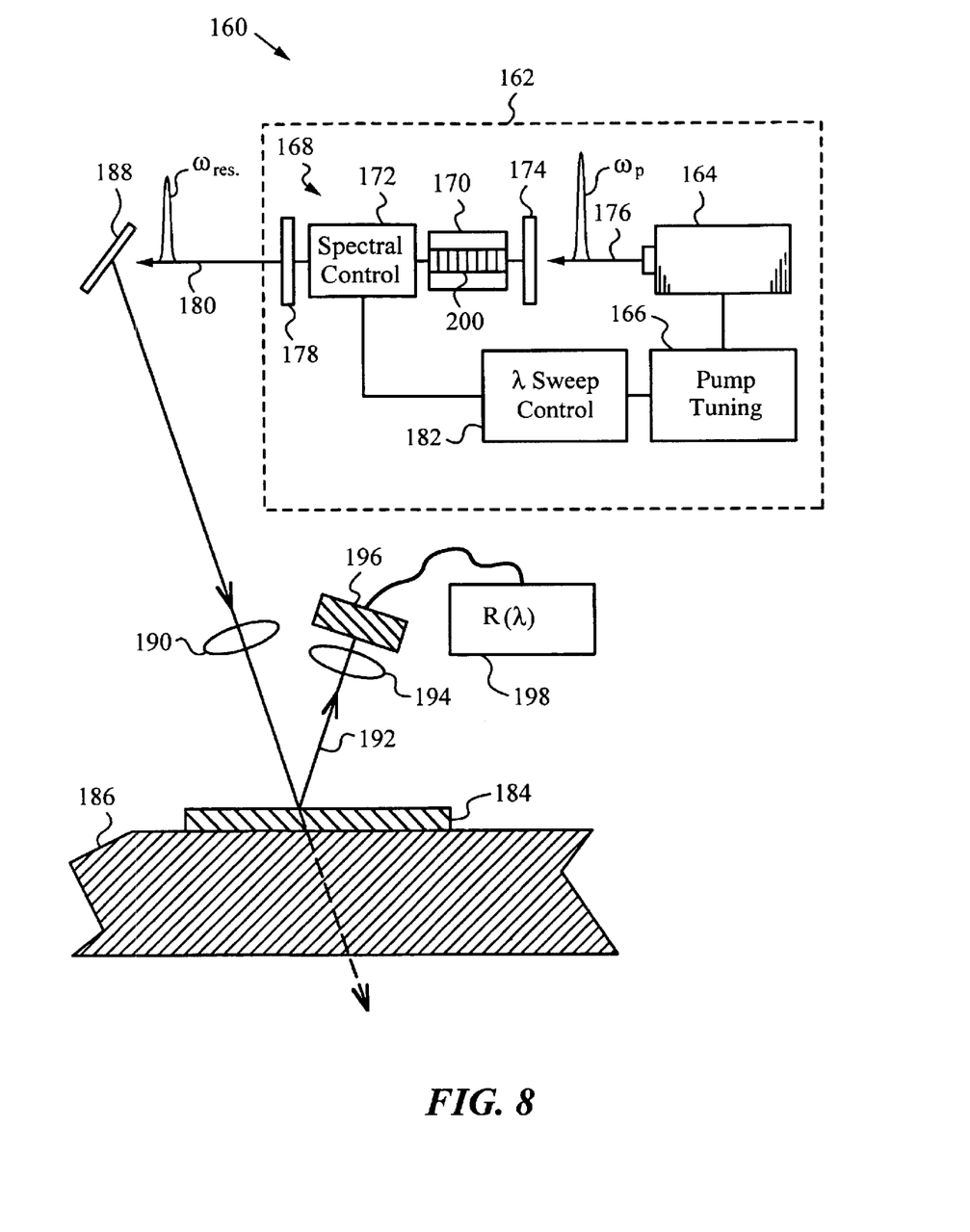
FIG. 8 is a diagram of a tunable light source for swept wavelength testing in accordance with the invention.

FIG. 8 illustrates a swept wavelength system 160 employing a tunable light source 162. Tunable light source 162 has a pump laser 164 whose pump wavelength $\omega_p$ is tuned by a pump tuning unit 166. Light source 162 further includes a cavity 168 containing a nonlinear converter 170 and a spectral control unit 172. Cavity 168 has an input coupler 174 for in-coupling a pump beam 176 from laser 164 and an output coupler 178 for out-coupling a resonant beam 180 at resonant frequency $\omega_{res.}$. Nonlinear converter 170 has a QPM grating 200 for phasematching optical parametric amplification of pump beam 176 near degeneracy.

In this embodiment, light source 162 is equipped with a wavelength sweep control 182. Sweep control 182 is connected to pump tuning unit 166 and to spectral control unit 172. Sweep control 182 is designed to sweep resonant frequency $\omega_{res.}$ across a portion of or the entire wavelength window available to light source 162.

Resonant beam 180 obtained from light source 162 is used for performing a swept wavelength test of a device under test (DUT) 184 positioned on a test stage 186. Resonant beam 180 is directed to DUT 184 by a mirror 188, conveniently a movable or scanning mirror, and is focused on DUT 184 by lens 190. A reflected beam 192 from DUT 184 is focused by a lens 194 on a photodetector 196. A reflectance spectrum analyzer 198 is connected to photodetector 196 for analyzing the test results. The principles of swept wavelength testing in reflectance as well as transmittance modes are well-know to a person skilled in the art and will not be discussed here. Shown in FIG. 8 is a free-space (bulk optics) implementation of a swept wavelength test system. It is obvious to one skilled in the art that a fiber-based implementation can be constructed using, for example, a fused fiber coupler as the output coupler and where the devices under test (DUTs) are fiber-pigtailed.

In this embodiment the parameters of light source 162 are in accordance with test requirements. For example, when DUT 184 is a passive or active telcom component and the measurement has to be performed in a manufacturing environment, sweep control 182 is optimized for speed. For example, sweep control 182 is adjusted to perform a sweep of the entire wavelength window within about 1 minute. In addition, the power level in resonant beam 180 is adjusted to be suitably high and the passband of spectral control unit 172 is set as narrow as required by the test. For example, in case DUT 184 contains small features, the passband of spectral control 172 is set to 0.1 to 10 pm or even less. The power level is set for 1 to 10 mW by adjusting power level of laser 164 and pulse synchronization, as discussed above. With these settings light source 162 will be able to support tuning rates of about 10–50 nm/sec or more and exhibits low noise, low amplified spontaneous emission (ASE) and polarized resonant beam 180.

In the specific case of swept wavelength testing, light source 162 does not need to be limited to performing optical parametric amplification in nonlinear converter 170. In fact, QPM grating 200 can be adjusted to the phase matching condition of other nonlinear frequency conversion processes driven by pump beam 176. Appropriate nonlinear conversion processes are known in the art and can include second harmonic generation, difference frequency generation or sum frequency generation. All of these processes can be operated in the near degenerate range, as required to obtain a suitable resonant beam for swept wavelength testing from light source 162.

In other variants of the invention it is possible, for example, to cascade several nonlinear steps to further broaden or shift the useful tuning range of the light source of the invention, without departing from the principles of near-degenerate operation and pump-wavelength and/or primary wavelength tuning. The preferred embodiment described above makes use of SHG followed by an OPO step, resulting in wide tuning around the primary wavelength. It is also possible to cascade SHG, followed by OPO, followed by SHG. This embodiment results in tuning the ≈700 nm to ≈850 nm range when starting with a primary wavelength near 1550 nm. In another embodiment one can cascade SHG, followed by OPO, followed by DFG (difference frequency generation) with a fixed (or tunable) source at a secondary wavelength. This embodiment would result in tuning in the ≈2800 nm to ≈4500 nm range when starting with a primary wavelength near 1550 nm and a fixed 1064 nm source serving as the secondary wavelength. Yet another embodiment would make use of an OPO followed by 2 stages of SHG, resulting in a tunable source in the range of about 350 nm to 450 nm. Thus, although the present invention and its advantages have been described in detail, it should be understood that various changes, substitutions, and alterations can be made herein without departing from the principle and the scope of the invention. Accordingly, the scope of the present invention should be determined by the following claims and their legal equivalents.

What is claimed is:

1. A tunable light source comprising:
   a) an optical parametric amplifier placed in a cavity for performing an optical parametric oscillation involving a signal beam and an idler beam;
   b) a pump arrangement for providing a pump beam at a pump frequency to said optical parametric amplifier such that said optical parametric oscillation is driven near degeneracy;
   c) an adjustment means for adjusting said pump frequency to select a gain spectrum of said optical parametric oscillation; and
   d) a spectral control means for setting a resonant frequency of said cavity within said gain spectrum.

2. The tunable light source of claim 1, wherein said spectral control means comprises a narrowband tuner for setting a passband for said resonant frequency.

3. The tunable light source of claim 2, wherein said narrowband tuner comprises an element selected from the group consisting of a diffraction grating filter, a tunable fiber Bragg grating, dielectric coated mirrors, dielectric coated filters and an etalon filter.

4. The tunable light source of claim 3, wherein said passband is set to reject one of said idler beam and said signal beam.

5. The tunable light source of claim 1, wherein said cavity is a multiple axial mode cavity.

6. The tunable light source of claim 5, wherein said cavity is selected from the group consisting of a ring cavity and a standing-wave cavity.

7. The tunable light source of claim 5, wherein said cavity comprises an optical fiber.

8. The tunable light source of claim 5, wherein said cavity has a length of more than 1 meter.

9. The tunable light source of claim 1, wherein said pump arrangement has a wavelength tuning range of about 1.5 nm about degeneracy.

10. The tunable light source of claim 1, wherein said pump arrangement comprises:
    a) a light source for producing a primary beam;
    b) a second harmonic generator for receiving and frequency doubling said primary beam to produce said pump beam.

11. The tunable light source of claim 10, wherein said second harmonic generator and said optical parametric amplifier are both contained in a nonlinear optical converter.

12. The tunable light source of claim 11, further comprising a wavelength filter for filtering said primary beam, said wavelength filter being positioned between said second harmonic generator and said optical parametric amplifier.

13. The tunable light source of claim 12, wherein said wavelength filter comprises an element selected from the group consisting of a spatial mode filter, a grating, a fiber-Bragg filter, a low pass filter, a directional coupler, a dichroic dielectric mirror, a grating-assisted coupler and an absorptive filter.

14. The tunable light source of claim 11, wherein said second harmonic generator comprises a first quasi-phase-matching grating in said nonlinear optical converter and said parametric amplifier comprises a second quasi-phase-matching grating in said nonlinear optical converter.

15. The tunable light source of claim 14, wherein said first quasi-phase-matching grating is aperiodic.

16. The tunable light source of claim 14, further comprising an optical coupler between said first quasi-phase-matching grating and said second quasi-phase-matching grating.

17. The tunable light source of claim 10, wherein said pump arrangement further comprises an optical amplifier for amplifying said primary beam.

18. The tunable light source of claim 1, wherein said optical parametric amplifier further comprises a quasi-phase-matching grating for phase matching said optical parametric oscillation.

19. The tunable light source of claim 18, wherein said quasi-phase-matching grating is distributed in a waveguide.

20. The tunable light source of claim 1, further comprising an output coupler for out-coupling at least one of said signal beam and said idler beam.

21. The tunable light source of claim 1, further comprising a wavelength sweep control for coordinating the adjustment of said pump frequency and selection of said resonant frequency, such that said resonant frequency sweeps across a wavelength window.

22. The tunable light source of claim 21, wherein said wavelength window comprises at least 100 nm.

23. The tunable light source of claim 21, wherein said spectral control means comprises a narrowband tuner for setting a passband for said resonant frequency, said passband ranging from 0.1 pm to 1000 pm.

24. The tunable light source of claim 1, further comprising a synchronizing unit connected to said pump arrangement for synchronizing said pump beam with a round-trip time of said cavity.

25. A swept wavelength system with a tunable light source comprising:
    a) an optical parametric amplifier placed in a cavity for performing an optical parametric oscillation involving a signal beam and an idler beam;
    b) a pump arrangement for providing a pump beam at a pump frequency to said optical parametric amplifier such that said optical parametric oscillation is driven near degeneracy;
    c) an adjustment means for adjusting said pump frequency to select a gain spectrum of said optical parametric oscillation; and
    d) a spectral control means for setting a resonant frequency of said cavity within said gain spectrum.

26. The swept wavelength system of claim 25, further comprising a wavelength sweep control for coordinating adjustment of said pump frequency and selection of said resonant frequency, such that said resonant frequency sweeps across a wavelength window.

27. The swept wavelength system of claim 26, wherein said wavelength window comprises at least 100 nm.

28. The swept wavelength system of claim 26, wherein said wavelength window is centered at approximately 1550 nm.

29. The swept wavelength system of claim 25, wherein said spectral control means comprises a narrowband tuner for setting a passband for said resonant frequency, said passband ranging from 0.1 pm to 1000 pm.

30. The swept wavelength system of claim 25, wherein said spectral control means comprises a narrowband tuner for setting a passband for said resonant frequency.

31. The swept wavelength system of claim 30, wherein said narrowband tuner comprises an element selected from the group consisting of a diffraction grating filter, a tunable fiber Bragg Grating, dielectric coated mirrors, dielectric coated filters and an etalon filter.

32. A swept wavelength system with a tunable light source comprising:
   a) a nonlinear optical converter placed in a cavity for performing a nonlinear frequency conversion, said nonlinear optical converter having a quasi-phase-matching grating for phase matching said nonlinear frequency conversion;
   b) a pump arrangement for providing a pump beam at a pump frequency to said nonlinear optical converter for performing said nonlinear frequency conversion;
   c) an adjustment means for adjusting said pump frequency to select a gain spectrum of said nonlinear frequency conversion; and
   d) a spectral control means for setting a resonant frequency of said cavity within said gain spectrum.

33. The swept wavelength system of claim 32, wherein said nonlinear optical converter comprises an optical parametric amplifier and said nonlinear frequency conversion comprises an optical parametric oscillation involving a signal beam and an idler beam.

34. The swept wavelength system of claim 33, wherein said nonlinear optical converter further comprises a second harmonic generator.

35. The swept wavelength system of claim 33, wherein said pump arrangement drives said optical parametric oscillation near degeneracy.

36. The swept wavelength system of claim 32, wherein said pump arrangement comprises:
   a) a light source for producing a primary beam;
   b) a second harmonic generator for receiving and frequency doubling said primary beam to produce said pump beam.

37. The swept wavelength system of claim 36, wherein said nonlinear optical converter comprises an optical parametric amplifier and both said second harmonic generator and said optical parametric amplifier are contained in said nonlinear optical converter.

38. The swept wavelength system of claim 37, further comprising a wavelength filter for filtering said primary beam, said wavelength filter being positioned between said second harmonic generator and said optical parametric amplifier.

39. The swept wavelength system of claim 32, wherein said quasi-phase-matching grating is distributed in a waveguide.

40. A method for tuning a light source comprising an optical parametric amplifier, said method comprising:
   a) placing said optical parametric amplifier in a cavity;
   b) producing a pump beam having a pump frequency;
   c) delivering said pump beam to said optical parametric amplifier for driving an optical parametric oscillation near degeneracy, said optical parametric oscillation involving a signal beam and an idler beam;
   d) adjusting said pump frequency to select a gain spectrum of said optical parametric oscillation; and
   e) setting a resonant frequency of said cavity within said gain spectrum.

41. The method of claim 40, wherein said resonant frequency is controlled by establishing a passband for at least one of said idler beam and said signal beam.

42. The method of claim 41, wherein said passband comprises between 0.1 pm and 1000 pm.

43. The method of claim 40, wherein said pump frequency is selected in a wavelength tuning range extending approximately 1.5 nm from said degeneracy.

44. The method of claim 40, further comprising removing one of said signal beam and said idler beam.

45. The method of claim 40, wherein said pump beam is a continuous-wave beam.

46. The method of claim 40, wherein said pump beam is a pulsed beam.

47. The method of claim 46, wherein said pulsed beam has a duty cycle ranging from 1% to 50%.

48. The method of claim 46, wherein said pump beam is synchronized with a round-trip time of said cavity.

49. The method of claim 40, further comprising generating said pump beam from a primary beam.

50. The method of claim 49, wherein said step of generating comprises a second harmonic generation.

51. The method of claim 40, wherein said pump frequency is shifted when said optical parametric oscillation is within an offset from degeneracy.

52. The method of claim 51, wherein said resonant frequency is confined to a passband and the wavelength separation between said signal beam and said idler beam is maintained at least equal to said passband.

53. The method of claim 51, wherein said offset ranges between about 50 pm and 500 pm.

54. A swept wavelength system with a tunable light source comprising:
   a) a nonlinear optical converter for performing a nonlinear frequency conversion, said nonlinear optical converter having a quasi-phase-matching grating for phase matching said nonlinear frequency conversion;
   b) a pump arrangement for providing a pump beam at a pump frequency to said nonlinear optical converter for performing said nonlinear frequency conversion;
   c) an adjustment means for adjusting said pump frequency to select a gain spectrum of said nonlinear frequency conversion; and
   d) a spectral control means for setting an output frequency within said gain spectrum.

55. The swept wavelength system of claim 54, wherein said nonlinear optical converter is placed within a cavity and said output frequency set by said spectral control means is a resonant frequency of said cavity.

* * * * *